Patented Oct. 31, 1933

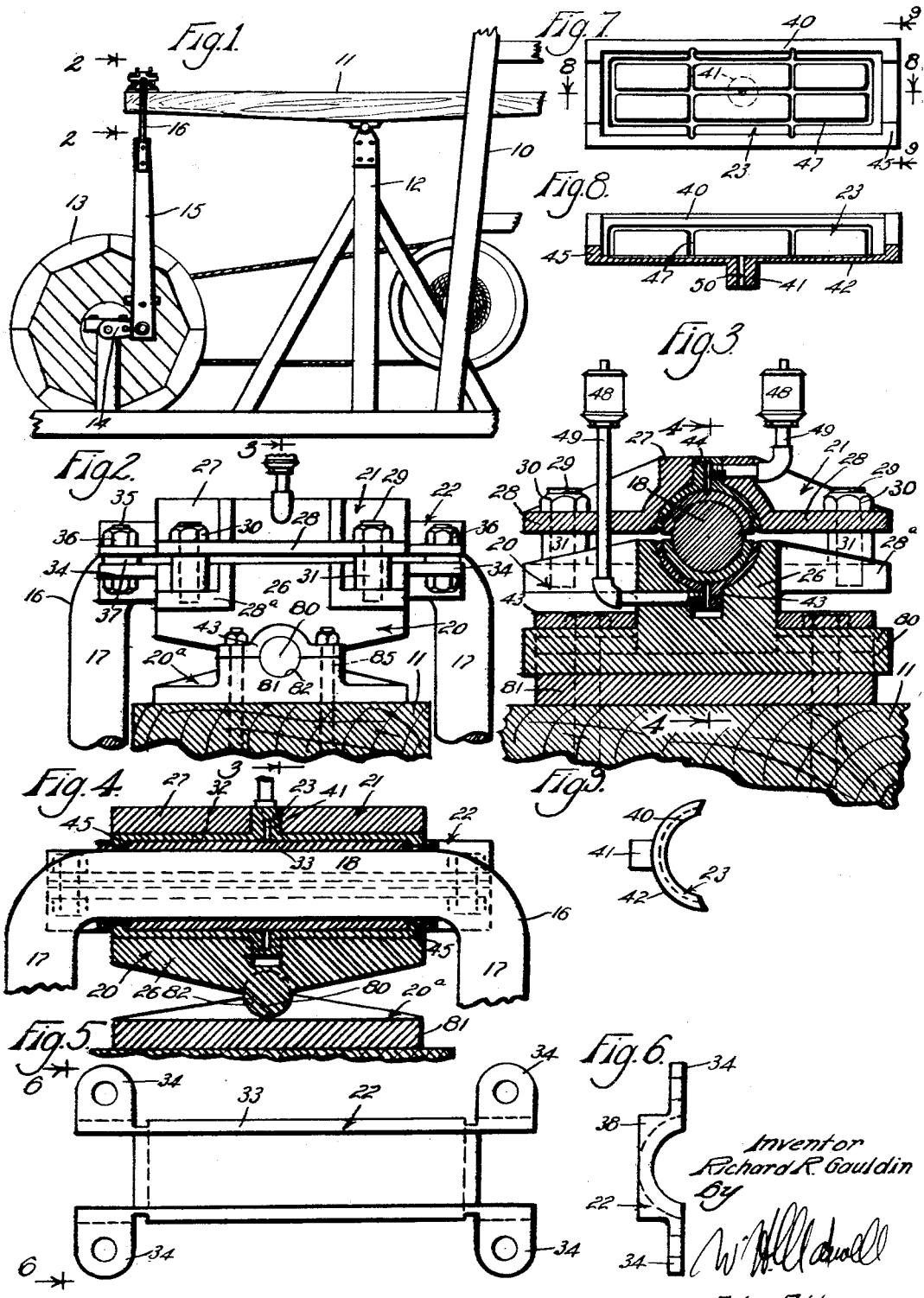

1,932,776

UNITED STATES PATENT OFFICE 1,932,776

BEARING CONSTRUCTION

Richard R. Gauldin, Fullerton, Calif.

Application April 12, 1930. Serial No. 443,681

2 Claims. (Cl. 308—74)

This invention relates to a bearing construction and relates more particularly to a bearing construction adapted for use in connection with a pitman, or the like.

The usual type of well drilling rig is provided with a walking beam used to operate drilling tools, a pump, or other devices. The walking beam is operated by a crank arm through a link or connecting member known as a pitman. The pitman is operatively connected to the walking beam by a stirrup fixed on the pitman and carried by a bearing device on the beam. The types of stirrups in general use are shaped or formed so that it is impractical to apply a common sleeve bushing to the portion of the stirrup operating in the bearing device. The oscillatory movement between the pitman and the walking beam causes the stirrup to wear out of round.

It is a general object of the present invention to provide an improved bearing construction which is effective in mounting a stirrup on the walking beam of a well drilling rig.

It is another object of the invention to provide a bearing construction that embodies a split journal or sleeve applicable to the bearing portion of the stirrup to operate in a bushing carried by a bearing device mounted on the walking beam.

It is a further object of the invention to provide a bearing construction of the character mentioned in which the working or wearing parts are replaceable and are inexpensive of manufacture.

Another object of the invention is to provide an improved mounting for the bearing which receives the stirrup of the pitman.

It is a further object of the invention to provide a bearing construction of the character mentioned that provides for proper lubrication of the working parts.

It is a further object of the invention to provide a bearing construction of the character mentioned that is practical, simple and inexpensive of manufacture.

The various objects and features of my invention will be best and more fully understood from the following detailed description of a typical preferred form of the invention, throughout which description reference is had to the accompanying drawing in which:

Fig. 1 is a view of a portion of a typical well drilling rig. Fig. 2 is an enlarged side elevation of the bearing construction provided by this invention, being a view taken substantially as indicated by line 2—2 on Fig. 1. Fig. 3 is an enlarged transverse detailed sectional view taken as indicated by line 3—3 on Fig. 2. Fig. 4 is a longitudinal detailed sectional view taken as indicated by line 4—4 on Fig. 3. Fig. 5 is a plan view of one of the sections of the split sleeve provided by this invention, being a view of the inner portion or inner side of the section. Fig. 6 is an end view of a section of the sleeve, being a view taken on line 6—6 on Fig. 5. Fig. 7 is a plan view or elevation of one of the sections of the bushing provided by this invention, being a view of the inner portion or side of the section. Fig. 8 is a longitudinal detailed sectional view of a section of the bushing, being a view taken as indicated by line 8—8 on Fig. 7. Fig. 9 is an end view of a section of the bushing, being a view taken as indicated by line 9—9 on Fig. 7.

The bearing construction provided by this invention is adapted for use in various situations and is particularly adapted to be used in connection with the walking beam of a well drilling rig. However, the invention is not to be construed as limited to the particular form and application about to be described, but is to be construed as embodying any features or modifications that may fall within the scope of the claims. In the drawing I have shown the bearing construction provided by this invention at the connection between the stirrup of the pitman and the walking beam of a typical well drilling rig. The rig illustrated includes a derrick 10, a walking beam 11 pivotally mounted on an upright or samson post 12, a band wheel 13, a crank arm 14 on the band wheel shaft, a pitman 15 connected to the crank arm, a stirrup 16 at the outer end of the pitman for connection with one end of the walking beam, and other parts commonly found on well drilling rigs. Throughout the following description I will consider the bearing construction provided by this invention as operatively connecting the stirrup 16 and the end portion of the walking beam 11.

The stirrup 16 shown in the drawing is typical of the types of stirrups in general use and consists of two spaced arms 17 attached to the pitman 15 and extending upwardly at the sides of the walking beam 11 and connected at their upper ends by a bearing portion 18 extending transversely over the walking beam 11. The bearing portion 18 is round in cross section. The walking beam shown in the drawing is formed of wood and is rectangular in cross section having a flat upper side.

The device provided by the present invention includes, generally, a bearing or pillow block 20, means 20ª for mounting the block 20 on the upper side of the walking beam 11, a cap 21 on the pillow block, a split journal or sleeve 22 applied to the bearing portion 18 of the stirrup to operate between the pillow block 20 and cap 21, and a split bushing 23 supporting the sleeve 22 in the pillow block 20 and the cap 21.

The pillow block 20 includes a body 26 extending transversely of the walking beam 11 and trunnions 80 projecting in opposite directions from the lower part of the body 26. The upper side of the body has a longitudinal groove for the reception of one of the bushing sections. The pillow block cap 21 is adapted to be clamped onto the pillow block 20 and consists of a body 27 to be arranged parallel with the body 26 of the block and has oppositely extending side flanges 28. Studs 29 extend upwardly from flanges 28ᵃ on opposite sides of the body 26 and extend through openings in the flanges 28. Clamping nuts 30 are screw threaded on the studs 29 to clamp the cap 21 on the pillow block 20. Suitable spacer sleeves 31 may be provided on the studs 29 and may be arranged between the upper side of the flanges 28ᵃ and the lower sides of the flanges 28. The cap 21 is provided in its lower side with a groove which registers with the groove in the upper side of the body 26 to form an opening 32 to carry the bushing 23. The opening 32 is somewhat larger in diameter than the portion 18.

The mounting means 20ᵃ includes a base 81 to be attached to the beam 11. A semi-circular seat or bearing 82 is formed in the upper part of the base to receive the trunnions 80 and caps 43 are arranged to hold the trunnions in the bearing. Bolts 85 are arranged through the beam, the base and flanges on the caps to secure the base on the beam and the caps in place to hold the trunnions. With this mounting, the block is free to tilt about an axis parallel with the beam and thus allow the working parts to center themselves.

The split journal or sleeve 22 is arranged on the bearing portion 18 of the stirrup to operate in the bushing carried by the opening 32. In the preferred form of the invention the sleeve 22 consists of two like sections 33 to be clamped on the portion 18. The sections 33 of the sleeve are adapted to be arranged longitudinally on the portion 18. The sections 33 are substantially semicircular in cross section and are of uniform thickness throughout their length to effectively engage the bushing 23. The ends of the sections 33 are adapted to project beyond the block 20 and are provided with oppositely extending radial flanges 34. In the form of the invention illustrated each end of each section 33 is provided with two flanges 34. The flanges are located beyond the pillow block 20 and project in opposite directions from the two sides of the sections 33. With the sections 33 arranged in their proper positions on the portion 18, the flanges 34 of the two sections are in direct alignment with each other. Bolts 35 extend through openings in the flanges 34 and clamping nuts 36 are screw threaded onto the bolts 35 to clamp the sections 33 together on the bearing portion 18. Spacing washers 37 may be provided on the bolts 35 to space the sections as desired. The ends of the sections 33 may be provided with radial guides or stops 38 to engage the ends of the pillow block 20 and cap 21 to prevent the stirrup 16 from shifting transversely of the walking beam 11.

The bushing 23 is arranged tightly in the opening 32 and rotatably carries the sleeve 22. The bushing includes two like sections 40 and may be formed of bronze, or the like. The sections 40 are substantially semi-circular in cross section, having curved outer sides to fit the walls of the opening 32 and curved inner walls or sides to support the sleeve 22. The sections 40 are preferably of the same length as the opening 32. A lug 41 projects from the outer side 42 of each section 40 intermediate its ends. The lugs 41 of the two sections 40 fit into openings in the pillow block 20 and the cap 21, there being an opening 43 in the pillow block 20 to carry one of the lugs 41 and an opening 44 in the cap to carry the lug 41 of the other section. The lugs 41 are provided to prevent the sections 40 from shifting or rotating in the opening 32. Radial flanges 45 may be provided on the inner side or wall of each section 40 adjacent its ends. The flanges 45 fit into grooves in the sections 33 and operate to prevent the sections 40 from shifting longitudinally in the openings 32 and hold oil in the bearing. Suitable oil grooves 47 may be provided on the inner sides of the sections 40.

A suitable lubricating system may be provided in connection with the construction provided by this invention. In the drawing I have illustrated a gravity lubricating system including lubricant containers 48 connected to each of the sections 40 of the bushing by conduits 49. The conduits 49 discharge into openings 50 in the lugs 41. The openings 50 communicate with the oil or lubricating grooves 47 in the inner walls or sides of the bushing sections.

It is believed that the operation of the device provided by this invention will be apparent from the foregoing detailed description. It is to be noted that the construction provided by the invention is effective in mounting the stirrup 16 on the walking beam 11 so that it does not receive excessive wear. The sleeve 33 is inexpensive of manufacture and may be easily replaced when it is necessary. The guides or stops 38 are effective in preventing the stirrup from shifting transversely relative to the walking beam 11. The bushing 40 is extremely simple and inexpensive of manufacture and is easily replaced when it becomes worn. The lugs 41 and flanges 45 cooperate to retain the sections 40 of the bushing in their proper positions. The flanges 45 also form cups or pockets in the inner sides of the sections 45 to retain lubricating material, or the like.

Having described only a typical, preferred form of my invention, I do not wish to limit myself to the specific details set forth, but wish to reserve to myself any changes or variations that may appear to those skilled in the art or fall within the scope of the following claims:

Having described my invention, I claim:

1. A bearing adapted to be mounted on a walking beam and adapted to receive a stirrup, the bearing including, a pillow block mounted on the beam, a cap on the block, the stirrup having a bearing portion to oscillate in the assembly of block and cap and arms projecting laterally from the opposite ends of the block, a sleeve on said bearing portion including two like separable sections, means retaining the sections on the bearing portion including flanges on the ends of the sections for engaging opposite sides of said arms, and stops at the ends of the sections for engaging the opposite ends of the block, and a split bushing on the sleeve having internal flanges at its ends cooperating with grooves in the sleeve.

2. A bearing adapted to be mounted on a walking beam and adapted to receive a stirrup, the bearing including a pillow block mounted on the beam, a cap on the block, the stirrup having a bearing portion to oscillate in the assembly of block and cap and arms projecting laterally from the opposite ends of the block, a sleeve on said bearing portion including two like separable sections, means retaining the sections in the bearing portion including flanges on the ends of the sections for engaging opposite sides of said arms, bolts connecting the flanges to clamp the sections of the sleeve onto the bearing portion, and stops at the ends of the sections for engaging the opposite ends of the block, and a split bushing on the sleeve having internal flanges at its ends cooperating with grooves in the sleeve.

RICHARD R. GAULDIN.